United States Patent [19]

Giorgetti

[11] 4,441,590
[45] Apr. 10, 1984

[54] BRAKING SYSTEM FOR MOTOR VEHICLE

[75] Inventor: Alberto Giorgetti, Paladina, Italy

[73] Assignee: Brembo S.p.A., Paladina, Italy

[21] Appl. No.: 22,454

[22] Filed: Mar. 21, 1979

[30] Foreign Application Priority Data

Aug. 4, 1978 [IT] Italy ............... 26517 A/78

[51] Int. Cl.³ .............................................. B60T 8/18
[52] U.S. Cl. ............................. 188/195; 180/227;
180/290; 188/344; 188/349; 267/151; 280/715;
303/6 C; 303/22 R
[58] Field of Search ............... 188/349, 195, 344;
303/6 C, 22 R; 180/227, 219, 290; 280/697,
715; 267/151

[56] References Cited

U.S. PATENT DOCUMENTS

| | | | |
|---|---|---|---|
| 2,270,366 | 1/1942 | Wolf | 303/22 R |
| 3,149,886 | 9/1964 | Dorner | 303/6 C X |
| 3,156,303 | 11/1964 | Hilder et al. | 267/151 X |
| 3,672,698 | 6/1972 | Froumajou | 280/697 |
| 3,817,342 | 6/1974 | Hamilton | 180/227 |
| 3,827,764 | 8/1974 | Giordano et al. | 188/195 X |

FOREIGN PATENT DOCUMENTS

1385180  2/1975  United Kingdom ............... 188/195

*Primary Examiner*—George E. A. Halvosa
*Attorney, Agent, or Firm*—Birch, Stewart, Kolasch & Birch

[57] ABSTRACT

A brake system for motor cycles is disclosed which includes a hydraulic master cylinder supplying a front brake and a rear brake and a pressure-regulating valve having a calibrating spring adapted to limit the maximum pressure on the rear brake to a predetermined value. The compression of the calibrating spring of the pressure-regulating valve is controlled by the relative motion of two distinct points on the rear shock spring.

2 Claims, 3 Drawing Figures

U.S. Patent  Apr. 10, 1984  4,441,590
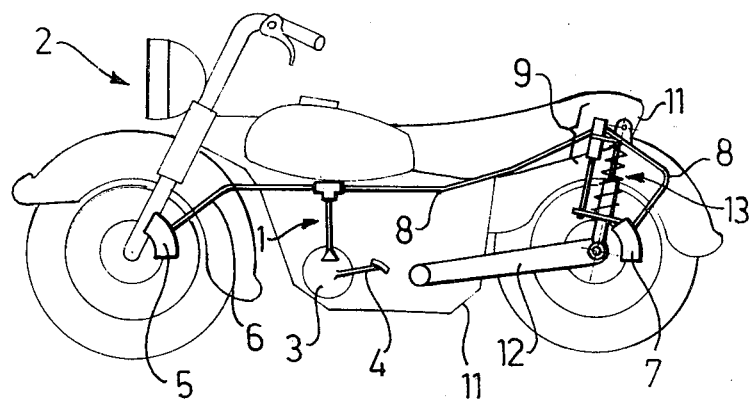
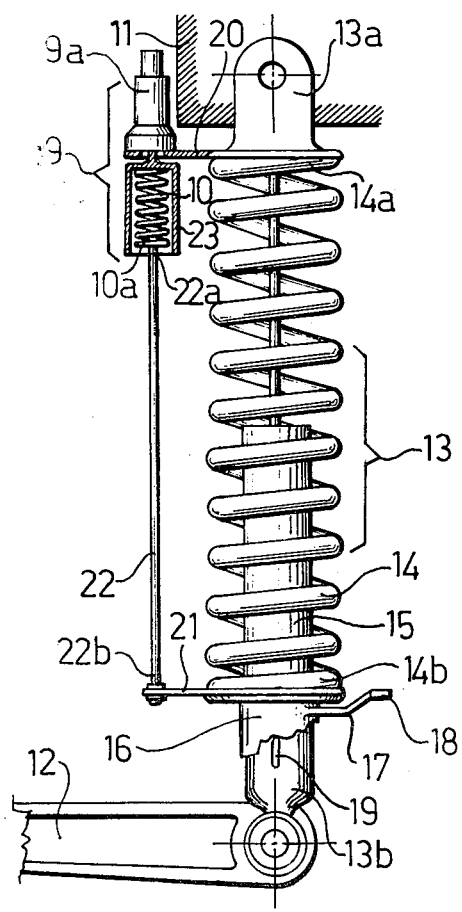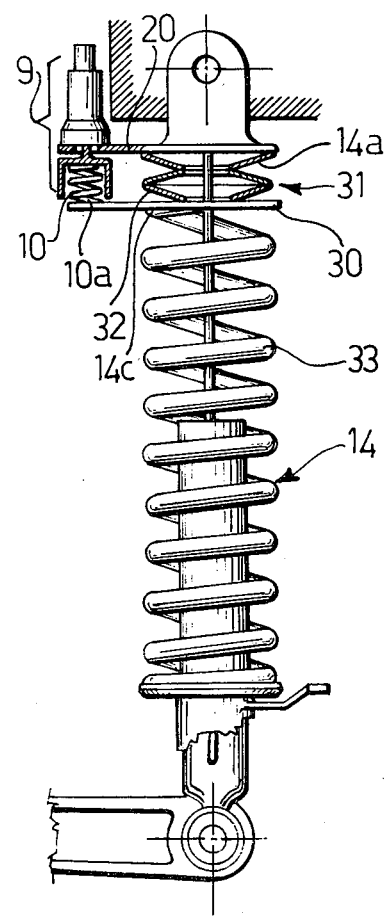

BRAKING SYSTEM FOR MOTOR VEHICLE

BACKGROUND OF THE INVENTION

The invention relates to a braking system for motor cycles equipped at the rear with a group comprising a spring and shock-absorber, the system being of the kind wherein a hydraulic master cylinder, usually pedal-actuated supplies a rear brake and a front brake, and wherein a pressure-regulating valve comprising a calibrating spring limits the maximum pressure on the rear brake to a predetermined value depending on the compression of the calibrating spring.

In the prior art, the pressure-regulating spring, which is usually secured to the motorcycle chassis, has a fixed calibration, i.e. the calibrating spring is calibrated so as to limit the maximum pressure on the rear brake to a predetermined fixed value.

The fixed value is determined in accordance with the maximum load on the motorcycle i.e. when it is carrying two persons weighing 75 kg each and 20 kg of baggage. It ensures optimum braking under the aforementioned maximum-load conditions.

The aforementioned system has a disadvantage in that when the motor cycle does not carry the maximum load, e.g. when it carries only a minimum load, i.e. the driver alone the rear braking is too sharp and abrupt.

A second disadvantage of the prior-art system, which occurs even under the maximum load conditions for which the system has been specially calibrated, is that, during braking, the load is transferred from the back wheel to the front wheel of the motorcycle as a result of inertia this produces varying load conditions on the back wheel, more particularly below the maximum load, so that the rear braking as before is too sharp and abrupt.

It has been suggested that the pressure-regulating valve should be provided with a manual control for varying the compression of the calibrating spring in accordance with the load conditions. This suggestion would obviate the first disadvantage but is impracticable in view of safety requirements, since, if the driver ever forgets to perform the manual operation for varying the compression of the calibrating spring, e.g., when a passenger gets onto his motorcycle the rear braking will be insufficient in that the calibration will accidentally have been left at the optimum value for the driver alone.

A second suggested solution, which would obviate both the first and the second aforementioned disadvantage, is likewise impracticable. According to the second solution, the compression of the calibrating spring is controlled by moving the rear suspension of the motorcycle relative to the chassis, by mechanically connecting the suspension to the free end of the calibrating spring of the pressure-regulating valve, which is secured to the chassis, so that when the suspension approaches the chassis there is an increase in the compression of the spring and vice versa.

This second solution is impracticable since a lever is disposed in a known manner between the chassis and the rear suspension on the spring and shock-absorber assembly of motor cycles. The lever is actuated by the driver so as to vary the position of the rear suspension in dependence on the load. As a result of the aforementioned means, the rear suspension is moved into a position relative to the chassis which is practically unaffected by variations in the load conditions. The aforementioned second solution is impracticable because the position of the rear suspension is carefully regulated in accordance with the load conditions.

The object of the invention is to provide a motorcycle brake system which obviates the disadvantages of the existing systems and guarantees optimum rear braking under all load conditions on the back wheel, due either to variations in the loads carried by the motorcycle or to variations in load occurring during braking when the load is transferred from the back wheel to the front wheel by inertia.

SUMMARY OF THE INVENTION

To this end, the invention provides a brake system of the specified kind, characterised in that the compression of the calibrating spring of the pressure-regulating valve is controlled by the relative motion of two distinct points on the spring of the shock absorber assembly aforementioned group comprising a spring and shock, via respective mechanical connecting means respectively secured between (a) each of the aforementioned two points on the spring and the pressure-regulating valve and (b) the free end of the calibrating spring of the valve, so that when the two points approach one another, there is an increase in the compression of the calibrating spring.

Other features and advantages of the invention will be clearer from the non-limitative description of a preferred embodiment given with reference to the accompanying drawings in which:

BRIEF DESCRIPTION OF THE DRAWINGS

FIG. 1 is a diagrammatic view of a brake system according to the invention;

FIG. 2 is a view, partly in section, of a detail of the brake system in FIG. 1, and FIG. 3 shows another embodiment of the brake system according to the invention.

DESCRIPTION OF A PREFERRED EMBODIMENT

In the accompanying drawings, the general reference 1 denotes a brake system designed for a known, diagrammatically indicated motor cycle 2. The system comprises a hydraulic master cylinder 3 actuated by a pedal 4, a front brake 5 supplied by master cylinder 3 via a line 6, a rear brake 7 supplied by master cylinder 3 via a line 8, and a pressure-regulating valve 9 associated with a calibrating spring 10 enclosed in a guide sleeve 23. The valve, which is known, is adapted to limit the maximum pressure on the rear brake to a predetermined value depending on the compression of the calibrating spring. Motorcycle 2 has a chassis 11, a rear suspension 12 and a shock absorber assembly 13 comprising a spring 14 and a shock-absorber 15. One end 13a of shock absorber assembly 13 is secured to chassis 11 whereas the other end 13b is secured to suspension 12.

Shock-absorber assembly 13 includes a cam means or spring preload adjuster 16 which can be manually actuated by a lever means 17 having a handle 18 and engaging an abutment 19 so as to regulate, in known manner, the position of spring 14. In FIG. 2, the body 9a of the pressure-regulating valve 9 is mechanically secured to a point on the spring 14 of shock absorber assembly 13 opposite end 14a of spring facing chassis 11, the mechanical connection comprising a plate 20 secured to the end 13a of group 13 facing the chassis, against which the end 14a of spring 14 abuts, body 9a of valve 9 being firmly secured to plate 20 by conventional bolts (not shown).

The free end 10a of the calibrating spring 10 of valve 9 is mechanically connected to a point on spring 14 of group 13 opposite end 14b of spring 14 facing the suspension 12. The mechanical connection comprises a plate 21 secured to the cam means 16 of group 13 which abuts the end 14b of spring 14, and also comprises a rod 22 having a disc-shaped end 22a engaging the free end 10a of spring 10. The end 22b of rod 22 is threaded and can be adjustably secured to plate 21 by conventional means (not shown in great detail) comprising a nut and lock nut.

According to another embodiment of the system according to the invention (FIG. 3), the free end 10a of spring 10 is mechanically connected to an intermediate point 14c on spring 14 at a given distance from end 14a. The mechanical connection includes an intermediate plate 30 inserted along spring 14 and engaging the free end 10a of spring 10.

Advantageously the portion of spring 14 between plate 30 and the top end 14a of spring 14 (this portion is denoted 31 in FIG. 3) includes a set of cup-springs 32 having a predetermined rigidity, different from that of the remaining portion 33 of spring 14.

The system according to the invention has the advantage of ensuring optimum rear braking in that the limiting value of the pressure of the rear brake is automatically adjusted in accordance with the static and dynamic load conditions which are actually operating on the back wheel of the motorcycle.

This occurs whether the driver carefully regulates the position of the suspension in dependence on variations in the load, or whether he omits to do so for any reason, since in all cases the variation, depending on the load, in the compression of the calibrating spring of the pressure-regulating valve depends only on the compression of spring 14.

What is claimed is:

1. An adjustable braking system for motorcycles having a suspension spring and shock absorber rear suspension assembly including a spring preload adjuster, and said rear suspension assembly being mounted between a frame and a rear wheel, said system comprising:
   at least one front brake;
   a rear brake;
   a master cylinder hydraulically connected to said at least one front brake and said rear brake; and
   a brake proportioning device hydraulically connected between said master cylinder and said rear brake, said brake proportioning device including;
   a pressure regulating valve for limiting the maximum pressure to be applied to said rear brake,
   a calibrating spring connected to said pressure regulating valve, said maximum pressure applied to said rear brake by said pressure regulating valve increasing in proportion to the compression of said calibrating spring, and
   linkage means operatively connected to said calibrating spring, said linkage means compressing said calibrating spring when the suspension spring is compressed to thereby vary the maximum pressure to be applied to said rear brake in response to variations in the length of said suspension spring, variations in the length of said suspension spring changing the length of said calibrating spring to also vary the maximum pressure to be applied to said rear brake, including,
   a first bracket attached to said rear suspension assembly between said suspension spring and said spring preload adjuster,
   a second bracket attached to said rear suspension assembly at the end of said suspension spring opposite to said spring preload adjuster,
   said pressure regulating valve and said calibrating spring being mounted to one of said brackets, and
   a pushrod having one end mounted to the other of said brackets, the other end of said pushrod being connected to said calibration spring to compress said calibration spring when said suspension is compressed.

2. An adjustable braking system for motorcycles having a suspension spring and shock absorber rear suspension assembly including a spring preload adjuster, said rear suspension assembly being mounted between a frame and a rear wheel, said system comprising:
   at least one front brake;
   a rear brake;
   a master cylinder hydraulically connected to said at least one front brake and said rear brake; and
   a brake proportioning device hydraulically connected between said master cylinder and said rear brake, said brake proportioning device including;
   a pressure regulating valve for limiting the maximum pressure to be applied to said rear brake,
   a calibrating spring connected to said pressure regulating valve, said maximum pressure applied to said rear brake by said pressure regulating valve increasing in proportion to the compression of said calibrating spring, and
   linkage means operatively connected to said calibrating spring, said linkage means compressing said calibrating spring when the suspension spring is compressed to thereby vary the maximum pressure to be applied to said rear brake in response to variations in the length of said suspension spring, variations in the length of said suspension spring changing the length of said calibrating spring to also vary the maximum pressure to be applied to said rear brake including,
   a first bracket mounted at a first point on suspension spring and extending perpendicular to the direction of compression of said spring;
   a second bracket mounted to a second part of said suspension spring and extending perpendicular to the direction of compression of said spring; and
   said pressure regulating valve and said calibrating spring being mounted between said first and second brackets.

* * * * *